Dec. 15, 1964  F. A. PACHMAYR  3,160,976
GUN RECOIL PAD
Filed May 21, 1962
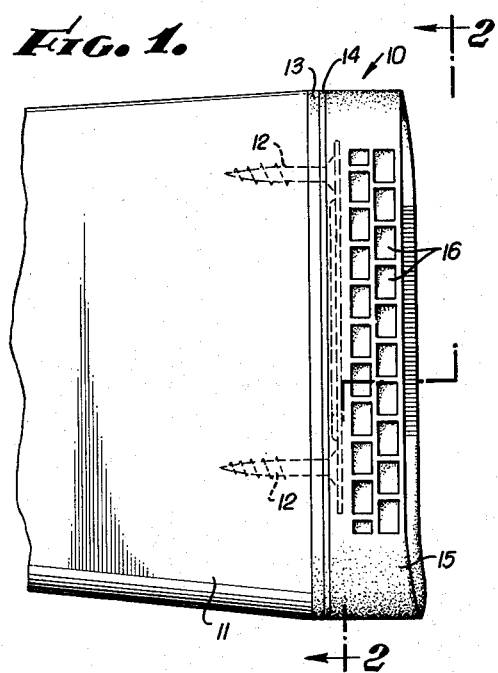
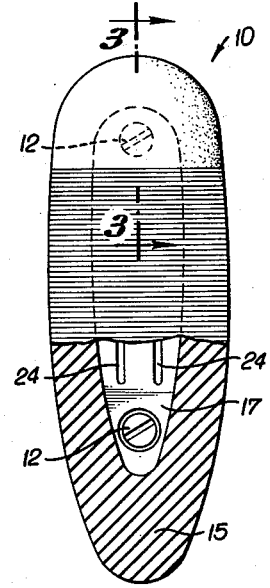
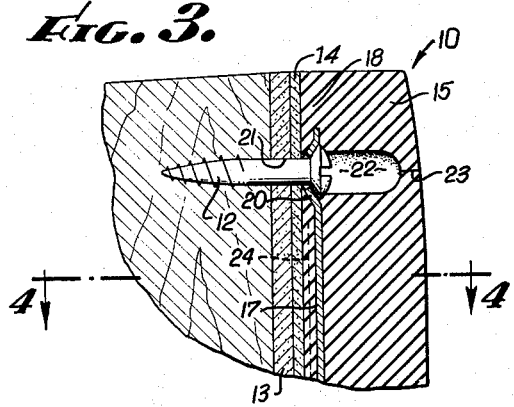
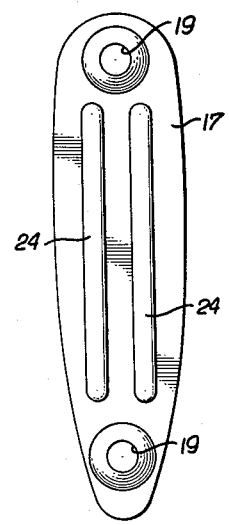
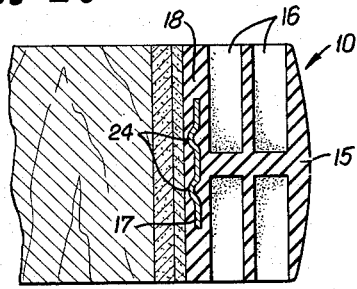
INVENTOR.
FRANK H. PACHMAYR
BY
ATTORNEYS.

United States Patent Office 3,160,976
Patented Dec. 15, 1964

3,160,976
GUN RECOIL PAD
Frank A. Pachmayr, Los Angeles, Calif., assignor to Pachmayr Gun Works, Inc., Los Angeles, Calif., a corporation of California
Filed May 21, 1962, Ser. No. 196,124
1 Claim. (Cl. 42—74)

This invention has to do with improvements in fire arm shoulder recoil pads applicable to the end of a gun stock, and has particular reference to improvements in that type of recoil pad comprising non-metallic laminations at the inner or stock side of the pad, to which is bonded a cushion rubber body.

Known shoulder pads of this general structure embody an inner face lamination of relatively rigid resinous or plastic composition to which is adhered what in the pad composite appears as an intermediate lamination which may be of resinous plastic or elastomeric composition harder and stiffer than the rubber forming the cushion body. While essentially rigid, the base laminations have some flexibility, and differentially so in relation to the rubber body, so that under recoil stresses and strains, separation tendencies may occur between the laminations, or between the interlaminate and the body.

My general object is to provide for retention of the essential identity of this type of pad, while internally reinforcing the pad structure against the separation tendencies noted, and at the same time provide for more permanently solid attachment of the pad structure to the end face of the gun stock.

More specifically, the invention contemplates imbedding and molding in the rubber at the outside of the laminations and in close proximity thereto a simple kind of reinforcement in the form of a metallic plate spaced peripherally within the rubber body and provided with screw holes registering with corresponding openings in the interlaminate. In the interests of simplicity and economy, consistent with its reinforcing functions and objectives, the plate preferably is made as an essentially flat stamping capable of occupying relatively narrow spacing between the interlaminate and cushioning apertures in the body. Preferably, the reinforcing plate is kept desirably thin but given the degree of rigidity required for its reinforcing functions, by forming the plate with longitudinal stiffening ribs extending between the screw apertures, all as will appear.

The various features and details of the invention will be more clearly understood from the following detailed description of an illustrative embodiment shown in the accompanying drawing, and in which:

FIG. 1 is a side elevation of the pad applied to the end face of a gun stock;

FIG. 2 is a bottom elevation end section taken on line 2—2 of FIG. 1;

FIG. 3 is a fragmentary enlarged section taken on line 3—3 of FIG. 2;

FIG. 4 is a cross section on line 4—4 of FIG. 3; and

FIG. 5 is an elevation of the reinforcing plate.

Referring first to FIG. 1, the pad assembly, generally indicated at 10, is shown to be attached to the end face of a gun stock 11 by screws 12, the pad structure including an inner relatively stiff, non-metallic resinous or plastic lamination 13 to which is bonded the interlaminate 14 which as previously indicated, may be somewhat flexible. The rubber body 15 of the pad is shown to have openings 16 which may be of any suitable design or configuration, extending inwardly from the sides to provide the cushion voids characteristic of recoil pads.

As illustrated in FIGS. 2 to 5, the body 15 contains a steel reinforcing plate 17 which is molded into and bonded within the body rubber at a location in close proximity to the interlaminate 14, the plate 17 preferably having the general longitudinal cross sectional configuration of the body 15 but at smaller dimension so that the rubber extends peripherally about the plate for a bondage to the interlaminate at 18. The reinforcing plate 17 has apertures 19 within countersinks 20 deflected toward the interlaminate 13, the plate apertures being aligned with apertures 21 extending through the interlaminates. The rubber body 15 may contain voids 22 apparently closed at the outside where the rubber is slitted at 23 to permit insertion of the screws and a driver in attaching the pad to the gun stock.

The plate 17 preferably is reinforced by longitudinally extending ribs 24 formed by stamped deflections of the metal toward the inside of the pad, thus imparting to the metallic plate which may be thinner than the interlaminate 13, substantially increased rigidity against flexure longitudinally.

As applied to the gun stock, the plate 17 affords solid anchorage for the pad independently of the laminations, and in a nevertheless slightly yielding condition by reason of the presence of a relatively thin layer of rubber at the inside of the plate. Otherwise the effect of the latter is to distribute throughout the plate area the compressive forces resulting from screw attachment to the gun stock, which forces are so transmitted and maintained with respect to the laminations 13 and 14, as to effectively resist their peripheral deflection from tight engagement with the stock, as well as interlaminate deflection and any tendencies of the rubber body to separate from the laminations 13.

I claim:

A recoil pad for application to a gun stock comprising,
(A) a laminated base including a non-metallic first relatively stiff layer applicable to the end of the stock and a second non-metallic relatively flexible inner layer bonded to a surface of said first layer, said layers being substantially coextensive,
(B) a rubber cushion body bonded to the opposite surface of said inner layer,
(C) a metallic stiffening plate embedded and confined within said body and positioned parallel to said opposite surface of said inner layer, said plate being peripherally spaced inwardly from the periphery of said body,
(D) said layers and plate having registering openings for passage of headed screws insertable through said body to engage the screw heads against the plate and thereby enable the plate to compress both of said layers in the applied condition of the pad,
(E) said body including a thin rubber layer between the plate and said inner layer and extending between said openings to yieldably distribute over said plate and said inner layer the compressive forces resulting from screw attachment to the gun stock,
(F) said plate having countersunk portions deflected at said openings toward said second layer and located proximate opposite ends of said thin rubber layer extending between said openings.

References Cited by the Examiner
UNITED STATES PATENTS

| 1,128,037 | 2/15 | Perkins | 42—74 |
| 1,331,074 | 2/20 | Marble | 42—71 |
| 1,951,135 | 3/34 | Emswiler | 42—74 |
| 2,344,752 | 3/44 | Utz | 42—74 |
| 2,925,679 | 2/60 | Bivens | 42—74 |
| 3,007,272 | 11/61 | Pachmayr | 42—74 |

BENJAMIN A. BORCHELT, Primary Examiner.